United States Patent Office 3,303,037
Patented Feb. 7, 1967

3,303,037
EXPANSIVE CEMENTS AND COMPONENTS THEREOF
Alexander Klein, Danville, Calif., assignor to Chemically Prestressed Concrete Corp., Van Nuys, Calif., a corporation of California
No Drawing. Filed May 12, 1966, Ser. No. 549,442
8 Claims. (Cl. 106—89)

This application is a continuation-in-part of my copending application Serial No. 145,964, filed October 18, 1961, since issued as U.S. Patent No. 3,155,526 on November 3, 1964, and entitled, "Calcium Aluminosulfate and Expansive Cements Containing Same"; and it is also a continuation-in-part of my application Serial No. 398,973, filed September 24, 1964, since issued as U.S. Patent No. 3,251,701 on May 17, 1966, and entitled, "Expansive and Shrinkage-Compensated Cements."

This invention relates to hydraulic cements and to components thereof which impart certain useful properties such as expansive properties.

In my copending applications above identified, (referred to hereinafter as the "first" and "second" applications, respectively) I have described a ternary compound $(CaO)_4(Al_2O_3)_3SO_3$ ($C_4A_3\bar{S}$ in Portland cement terminology) which may be formed separately and added to Portland cement or which may be formed in situ along with the normal Portland cement components. Such ternary compound is advantageous in Portland-type hydraulic cements.

By "Portland type" hydraulic cement as used herein is meant conventional Portland cements in which the predominant components are di and/or tri-calcium silicates ($C_2S$ and/or $C_3S$, S being the symbol for $SiO_2$ as distinguished from $\bar{S}$, which is the symbol for $SO_3$) and it also includes Portland-type blended or interground cements such as Portland-pozzolan and Portland-blast furnace slag cements, and also calcium aluminate cements.

If the aforesaid ternary compound is present in a Portland-type cement in conjunction with sufficient CaO and $CaSO_4$, it will, upon hydration, form a high and/or low sulfate hydrate, $3CaO \cdot Al_2O_3 \cdot 3CaSO_4 \cdot 30-32H_2O$ and/or $3CaO \cdot Al_2O_3 \cdot CaSO_4 \cdot 12 H_2O$, respectively. It is this hydrated product or products (believed to be primarily the high sulfate product) which brings about expansion during the curing of a concrete, of a mortar or grout mix prepared by admixture of mineral aggregate or sand, water and Portland-type cement, provided the cement contains the aforesaid ternary compound $C_4A_3\bar{S}$ together with CaO and $CaSO_4$. This expansion is sufficient to compensate in whole or in part for drying shrinkage of the concrete or mortar. If enough of the system $$C_4A_3\bar{S} + CaO + CaSO_4$$

is present and if the proportions of CaO and $CaSO_4$ are sufficient to substantially fully develop the expansive potential of the system, a net expansion occurs. Shrinkage compensation (as distinguished from net expansion) has the advantage of eliminating or reducing shrinkage cracks which are brought about by the fact that, during drying shrinkage of concrete, restraints such as the form in which the concrete is poured, and/or the underlying surface of a slab (e.g., the soil or base upon which a slab is laid) and/or reinforcement members, oppose the shrinkage and place the concrete in tension to an extent which exceeds the tensile strength of the concrete. Net expansion has the additional advantage that it stresses reinforcement members without the need to stress them by mechanical means.

The CaO and $CaSO_4$ needed to develop the expansive potential of $C_4A_3\bar{S}$ may be provided in either of two ways or by a combination of both ways. One way is to provide a raw feed mixture which contains or which, upon burning in a kiln, provides CaO, $SiO_2$, $Al_2O_3$ and $SO_3$ so that an adequate amount of $C_2S$ and/or $C_3S$ is formed to constitute the resulting clinker a Portland-type cement clinker, and so that an adequate amount of $C_4A_3\bar{S}$ is formed and also adequate amounts of CaO and $CaSO_4$. Resort may be had to entirely empirical methods of proportioning. Such empirical methods are facilitated by using the equations set forth in my second application. These equations (which are analogous to the well known Bogue equations applicable to conventional Portland cement) enable one to calculate, with a good degree of approximation, the potential compound composition of the clinker based upon the oxide composition of the starting materials. In connection with these equations, it has been found that $Fe_2O_3$ (F in the usual nomenclature) will be taken up as a ferrite phase, probably $C_6A_2F$ because of the high alumina content of the clinker. Also, greater accuracy is achieved by excluding $TiO_2$ (if present) from the alumina (with which it is commonly included). On this basis, my equations are as follows:

(1) $C_6A_2F = 4.39F$
(2) $C_4A_3\bar{S} = 2.00A = 2.56F$
(3) $C\bar{S} = 1.70\bar{S} - 0.45A + 0.57F$
(4) Extractable $CaO(C_E)$ = observed extractable CaO by method of ASTM C114-58
(5) Total expansive complex or system = $1.70\bar{S} + 1.55A - 2.00F + C_E$ The net CaO ($C_{net}$) available to form $C_3S$ an $C_2S$ with silica is calculated from the following equation (in which $C_{total}$ is the total CaO as determined by analysis or by formulation of the raw mix):

(6) $C_{net} = C_{total} - 0.70\bar{S} - 0.56A - 1.40F - C_E$

The proportions of $C_3S$ and $C_2S$ are then given by the following equations:

(7) $C_3S = 4.07_{net} - 7.60S$
(8) $C_2S = 2.87S - 0.75C_3S$

It will be understood that these equations (like the Bogue equations) are approximate and that the compound analysis of the cement will be influenced by various factors including the nature and amounts of impurities and the conditions of burning. But in any case each particle of the ground clinker will contain (a) one or more calcium silicates of the type present in Portland cement quantity sufficient to make an hydraulic cement, and (b) a significant amount of calcium sulfoaluminate and, in the preferred embodiment of the invention, a sufficient amount of lime and $CaSO_4$ to be expansive enough, upon hydration to compensate for shrinkage of the grout, mortar or concrete to bring about a net expansion.

A second way of incorporating sufficient CaO and $CaSO_4$ is to add them to the cement or intergrind them with the clinker, the lime being added as such and the $CaSO_4$ being added as gypsum or a less hydrous form of $CaSO_4$. In a modified procedure, gypsum may be added as such and CaO can be supplied indirectly as its hydrate through its formation upon hydration of the calcium silicates. Also, the raw materials may be proportioned to produce a clinker containing $C_4A_3\bar{S}$ and $C\bar{S}$ and calcium hydroxide may be produced by hydration of the silicates.

Moreover, as stated in my second application, the presence of $C_4A_3\bar{S}$ alone ("alone' in the sense that significant amounts of CaO and $CaSO_4$ are not present) is beneficial because it will result in more rapid development of strength of concrete made from the cement;

or because the reactants which form it will make possible a lower burning temperature in manufacture of the clinker; or because the inclusion in the raw mix of the ingredients which react to produce the calcium alumino sulfate will allow a wide choice of raw materials, including those not generally considered satisfactory for Portland cement manufacture, particularly such as gypsum and gypsiferous clays.

It will, therefore, be apparent that a wide spectrum of useful $C_4A_3\bar{S}$ compositions is contemplated, including (1) pure $C_4A_3\bar{S}$ with or without CaO and/or CaSO$_4$ (which, if present, are formed in situ along with $C_4A_3\bar{S}$ or are added as such); including (2) additions of $C_4A_3\bar{S}$ (with or without CaO and/or CaSO$_4$) and Portland-type cement; and (3) including Portland-type cements with $C_4A_3\bar{S}$ formed in situ with the cement clinker (with or without CaO and/or CaSO$_4$ which, if present, may have been formed in situ or may have been added as such).

It is an object of the present invention to provide other ternary compounds of the type $C_4A_3\bar{S}$ but in which C (=CaO) and/or A (=Al$_2$O$_3$) are replaced in whole or in part by other oxides.

More particularly the present invention relates to a broad spectrum of cements (Portland-type, as defined above) and cement additives which contain or which are ternary compounds of the general type $$(C_aX_b)(A_cY_d)\bar{S}$$

wherein C, A and $\bar{S}$ represent CaO, Al$_2$O$_3$ and SO$_3$, respectively; X represents the oxide or oxides of one or more of the elements (other than calcium) of the alkaline earth group, especially magnesium and/or barium, but also beryllium and strontium; and Y represents one or more sesquioxides other than aluminum oxide, e.g., Fe$_2$O$_3$, Cr$_2$O$_3$, Mn$_2$O$_3$, V$_2$O$_3$, also TiO$_2$. In this formula 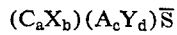 the subscripts $a$, $b$, $c$ and $d$ represent the molar proportions of the respective oxides with the proviso that $a$ and $c$ may be zero, that $a+b=4$ and that $c+d=3$, such that in the lattice of the ternary compound there are four moles of the alkaline earth oxide for each three moles of sesquioxide (or TiO$_2$) and for each mole of sulfur trioxide. It will also be understood that more than one alkaline earth oxide represented by X may be present in the ternary compound; that more than one sesquioxide represented by Y may be present in the ternary compound; and that TiO$_2$ may constitute all or a part of Y.

To achieve full or partial expansive potential (in the stated sense of compensating or more than compensating for drying shrinkage of concrete or mortars), an appropriate oxide and an appropriate sulfate should be present. Such a system or complex can then be represented as follows:

$$(C_aX_b)(A_cY_d)\bar{S}+m(ZO)+n(Z'\bar{S})$$

wherein Z represents an alkaline earth metal (or more than one such metal) including calcium, and Z' represents two hydrogen equivalents of any metal oxide capable of forming a stable sulfate which will supply SO$_3$ upon hydration of the complex in quantity sufficient to form one or the other of the hydrates derived from the ternary compound. Examples of Z and Be, Mg, Ca, Ba, Na$_2$ and K$_2$. The coefficients $m$ and $n$ are the molar proportions of ZO and Z'$\bar{S}$ and either of them may range from zero to a value such as to develop fully the expansive potential of the complex. Examples of Z' are Ca, Mg, Na$_2$, K$_2$, etc.

Either or both of the components $m(ZO)$ and $n(Z'\bar{S})$ 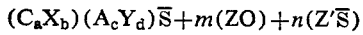 may be formed in situ by proper selection and proportioning of raw materials; or either one or both of them may be added as such; or either or both may be absent.

Among the advantages of expansive [1] complexes as described above are the following: Such complexes permit a wider selection of raw materials, and they permit the employment of such economical minerals as dolomitic limes, dolomites, siliceous dolomitic limes, siliceous dolomites and low quality magnecites and hydromagnecites.

To produce the ternary compound $(C_aX_b)(A_cY_d)\bar{S}$ or the complex $$(C_aX_b)(A_cY_d)\bar{S}+m(ZO)+n(Z'\bar{S})$$

the procedures of my Patent No. 3,155,526 may be employed; that is, sources of CaO (if it is to be present), of X, of Al$_2$O$_3$ (if it is to be present), of Y and of SO$_3$ are provided. A single mineral may, of course, provide a source of two such oxides; e.g., CaSO$_4$ provides CaO and SO$_3$, MgSO$_4$ provides MgO and SO$_3$, etc. A suitable mixture proportioned to produce the ternary compound or the complex is provided in suitably comminuted form, and it is fed to a rotary kiln, placed in an electric furnace, on a sintering belt or in other suitable equipment and it is heated, preferably to a temperature below melting, e.g., as high as a temperature to result to incipient fusion, such temperature and the time of holding being sufficient to form the ternary compound and (where desired and where the proportions of raw materials are properly selected) ZO and Z'$\bar{S}$.

To produce such ternary compound or complex in situ in a Portland-type cement, the raw materials also include a source or sources of the Portland cement components, e.g., limestone to provide the needed CaO and silica sufficient to provide the needed SiO$_2$ to form C$_2$S and/or C$_3$S.

In the examples to follow, the raw materials may be either minerals or salts capable of yielding oxides of the alkaline earth metals, oxides of aluminum and the like—manganese, iron, titanium, vanadium—and sulfates. Magnesium oxide may be derived either from magnecite, dolomite, shales, clays or ferromagnesian rocks. Both magnesium oxide and sulfate may be derived from magnesium sulfate and both aluminum oxide and sulfate may be derived from aluminum sufate. Oxide of aluminum may be derived from high grade manufactured alumina, bauxite, diaspore, or high alumina clays. The raw materials, or their proportions need not be unique. It is required only that the available and preferably economic materials be proportioned in a manner to yield the oxide compositions listed in the examples.

The most economic industrial minerals or salts which may be utilized will of course have greater or lesser amounts of impurities other than the oxides involved in the active expansive compositions. Depending upon their amount, nature and the temperature to which the compositions of raw mix are burned, such impurities can combine in solid state reactions with the same oxides as are present in the expansive compositions and thus reduce the quantitative measure of the given expansive complex. Generally the presence of these compounds involving impurities, and their composition can be determined by X-ray diffraction. Thereafter, a crude estimate can be made of the amount of expansive complex for the desired composition. As a first example, there is given the oxide composition of a complex where portion of the $C_4A_3\bar{S}$ is replaced in part by magnesium oxide—that is $M_2C_2A_3\bar{S}$ which can also be written as related to the expression $$2M_2C_2A_3\bar{S}=M_4A_3\bar{S}+C_4A_3\bar{S}$$

(M=MgO in Portland cement terminology). The "complex" may be either of oxide compositions as shown above, alone, or it may be associated with either calcium oxide, calcium-magnesium oxide or other oxides (not necessarily alkaline-earth oxides), or it may be associated both with the oxides noted just before and with sulphate, or other sulphates (not necessarily alkaline-earth sulphates).

In the examples to follow, only the oxide compositions to produce a desired "complex" are given, the impurities

---

[1] "Expansive" being defined as conducive to expansion, at least sufficient to compensate for a substantial amount of normal drying shrinkage of a concrete, mortar or grout mix upon curing and drying thereof.

and the proportions of raw materials being only a matter of compositions of raw materials selected, and simple calculations of proportions based upon their compositions.

The percentages of the constituents of the complex are not necessarily unique. The ternary compound may be present in the complex in an amount between 20% and 100%, and each of the associated compounds in the complex may be present in amounts individually as the given oxide or together as the oxide and the sulphate in amounts between zero and 50 percent.

In the examples to follow compositions for the "complex" selected are in percentages by weight of clinker—that is, non-volatile basis.

*Example 1.*—*50% $M_4A_3\bar{S}$, 50% $C_4A_3\bar{S}$ (expressed on oxide analysis basis)*

MgO _____ 14.7
CaO _____ 18.4
$Al_2O_3$ _____ 53.0
$SO_3$ _____ 13.9

*Example 2.*—*100% $M_4A_3\bar{S}$ (expressed on oxide analysis basis)*

MgO _____ 29.3
$Al_2O_3$ _____ 56.0
$SO_3$ _____ 14.7

*Example 3.*—*40% $M_4A_3\bar{S}$, 40% $C_4A_3\bar{S}$, 20% CaO (expressed on oxide analysis basis)*

MgO _____ 11.7
CaO _____ 34.7
$Al_2O_3$ _____ 42.5
$SO_3$ _____ 11.1

*Example 4.*—*35% $M_4A_3\bar{S}$, 35% $C_4A_3\bar{S}$, 15% MgO, 15% CaO (expressed on oxide analysis basis)*

MgO _____ 25.3
CaO _____ 27.9
$Al_2O_3$ _____ 37.1
$SO_3$ _____ 9.7

*Example 5.*—*60% $M_4A_3\bar{S}$, 20% CaO, 20% $MgSO_4$ (expressed on oxide analysis basis)*

MgO _____ 24.2
CaO _____ 20.0
$Al_2O_3$ _____ 33.6
$SO_3$ _____ 22.2

In the foregoing Examples 1 to 5, oxide analyses of the clinker are set forth. Assuming pure oxides were used as starting materials, these oxide analyses would also be the feed analyses. Ordinarily, of course, the feed materials will contain impurities and volatile components which will be taken into consideration in determining or approximating the feed mixture. By simple trial and error, optimum feed mixtures can be determined.

It is obvious that many other combinations can be illustrated involving the ternary compounds of $X_4A_3\bar{S}$ in the alkali-earth metals group associated with either the oxides or the oxides and sulfates of that group, or with other oxides or other combinations of oxides and sulfates not of that group.

This complex may be utilized as a portion of an integral cement, containing not only the complex or complexes in combinations suggested above for some of which examples have been illustrated but also the calcium silicates, tricalcium silicate ($C_3S$) and dicalcium silicate ($C_2S$) in the desired proportions of total silicates from 10 to 90 percent and the proportions of silicates to each other as desired, even to the exclusion of one of the silicates. For example, as shown hereafter, and again excluding impurities such as titania and alkalies, and again upon the clinker—volatiles free basis, are the following:

*Example 7.*—*30% complex of Example 4, 50% $C_3S$, 20% $C_2S$*

MgO _____ 7.3
CaO _____ 55.9
$Al_2O_3$ _____ 10.1
$SO_3$ _____ 6.7
$SiO_2$ _____ 20.0 or, excluding $C_2S$ altogether,

*Example 8.*—*30% complex of Example 4, 70% $C_3S$*

MgO _____ 7.3
CaO _____ 57.6
$Al_2O_3$ _____ 10.1
$SO_3$ _____ 6.7
$SiO_2$ _____ 18.3

In any of the examples above, part or all of the $Al_2O_3$ may be replaced by an equivalent amount of $Fe_2O_3$, $V_2O_3$, $Mn_2O_3$, $Cr_2O_3$, $TiO_2$, etc.

Raw mixes prepared accordingly and in suitably comminuted form, are supplied to a rotary kiln, an electric furnace or a sintering belt and heated to a temperature below melting, and held at such temperature until, as revealed by suitable methods such as X-ray methods and differential thermal analysis, a stable system has been achieved; after which the resulting clinker is cooled and ground. The products of Examples 1 to 6 will be added to Portland-type cement or interground with Portland-type cement clinker. The products of Examples 7 and 8 may be used directly as Portland-type cements. All of the cements produced in accordance with Examples 1 to 8 will exhibit modified shrinkage properties as compared to Portland cement concretes, ranging from substantially reduced net shrinkage to net expansion.

The temperatures for burning the compositions claimed have been noted such as to be below the melting point of the given composition when burned in rotary kilns, sintering furnaces or stationary furnaces, as a matter of practical production practice. In such instances, melts continue to considerable operating difficulties. In some instances however, the compositions may be so refractory as to require an electric hearth to achieve the desired or required temperatures of sintering, burning, or calcination to achieve the required combination of oxides provided in the raw materials mixture. In some types of burning equipment, for example electric hearths, specially equipped rotary kilns, and the like, melts can be handled without inconvenience. In fact, under some conditions for some of the higher sulphated compositions, conditions such as ringing, slagging, slabbing, caking, and the like are most conveniently avoided by going to a melt that may be readily discharged at high temperatures as a fluid. There is no objection to producing any of the compositions claimed as a melt, whether the melt temperatures be relatively low, or relatively high in the range of about 1800° F. to about 4000° F.

I claim:

1. Ternary compounds having the formula $$(C_aX_b)(A_cY_d)\bar{S}$$

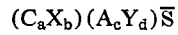

wherein C, A and $\bar{S}$ represent CaO, $Al_2O_3$ and $SO_3$, respectively, X is an alkaline earth metal oxide other than calcium oxide, Y is selected from the group consisting of titanium dioxide and sesquioxides other than aluminum oxide, and the subscripts $a$, $b$, $c$ and $d$ are the molar proportions of C, X, A and Y, respectively, with the proviso that $a$ and $c$ may be zero, $b$ and $d$ are substantially greater than zero, $a+b=4$ and $c+d=3$.

2. Ternary compounds according to claim 1 associated with sufficient alkaline earth oxide and sulfate to develop the expansive potential of the ternary compounds.

3. An intimate mixture of a Portland type cement and a ternary compound as described in claim 1, the Portland type cement being present in sufficient proportion that the mixture is essentially a Portland type cement, the ternary compound being present in sufficient amount that, in the presence of an adequate amount of lime and calcium sulfate, and upon admixture with water and a mineral aggregate to form a concrete mix, drying shrinkage of the concrete will be at least substantially compensated.

4. A Portland type cement which in clinker form contains and wherein each particle of the ground clinker contains (a) a Portland type cement and (b) a ternary compound having the formula $(C_aX_b)(A_cY_d)\bar{S}$ wherein C, A and $\bar{S}$ represent CaO, $Al_2O_3$ and $SO_3$, respectively, X is an alkaline earth metal oxide other than calcium oxide, Y is selected from the group consisting of titanium dioxide and sesquioxides other than aluminum oxide, and the subscripts $a$, $b$, $c$ and $d$ are the molar proportions of C, X, A and Y, respectively, with the proviso that $a$ and $c$ may be zero, $b$ and $d$ are substantially greater than zero, $a+b=4$ and $c+d=3$; the proportion of (a) being such that the cement is essentially a Portland type cement, the proportion of (b) being such that, in the presence of an adequate amount of lime and calcium sulfate, and upon admixtures with water and a mineral aggregate to form a concrete mix, drying shrinkage of the concrete will be at least substantially compensated.

5. Ternary compounds of claim 1 wherein X is MgO.
6. Ternary compounds of claim 2 wherein X is MgO.
7. The cement of claim 3 wherein, in the ternary compound, X is MgO.
8. The cement of claim 4 wherein X is MgO.

References Cited by the Examiner
UNITED STATES PATENTS

| | | | |
|---|---|---|---|
| 3,155,526 | 11/1964 | Klein | 106—89 |
| 3,251,701 | 5/1966 | Klein | 106—89 |

HELEN M. McCARTHY, *Acting Primary Examiner.*

S. E. MOTT, *Assistant Examiner.*